US007027232B2

(12) United States Patent
Bakin et al.

(10) Patent No.: US 7,027,232 B2
(45) Date of Patent: Apr. 11, 2006

(54) OPTICAL CROSS-CONNECT SWITCH WITH TELECENTRIC LENS AND MULTI-SURFACE OPTICAL ELEMENT

(75) Inventors: Dmitry V. Bakin, San Jose, CA (US); Cheng-Chung Huang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 10/354,887

(22) Filed: Jan. 29, 2003

(65) Prior Publication Data

US 2004/0145817 A1    Jul. 29, 2004

(51) Int. Cl.
G02B 13/22    (2006.01)
G02B 17/08    (2006.01)
G02B 6/32    (2006.01)

(52) U.S. Cl. .................... 359/663; 359/726; 385/18; 385/33

(58) Field of Classification Search .............. 385/18, 385/33, 47; 359/726, 663
See application file for complete search history.

(56) References Cited

U.S. PATENT DOCUMENTS

| 5,583,686 | A | 12/1996 | Chen |
| 5,692,287 | A | 12/1997 | Nakamura et al. |
| 6,166,860 | A | 12/2000 | Medvedev et al. |
| 6,359,736 | B1 | 3/2002 | Yoshimura |
| 6,487,334 | B1 * | 11/2002 | Ducellier et al. .............. 385/22 |
| 6,501,877 | B1 * | 12/2002 | Weverka et al. .............. 385/31 |
| 6,590,712 | B1 | 7/2003 | Schaller |
| 6,678,097 | B1 | 1/2004 | McKenney |
| 6,694,073 | B1 * | 2/2004 | Golub et al. .................. 385/22 |
| 6,704,476 | B1 * | 3/2004 | Ford et al. ..................... 385/18 |
| 2003/0007253 | A1 | 1/2003 | Schuster et al. |
| 2003/0026526 | A1 * | 2/2003 | Trissel et al. ................. 385/18 |

* cited by examiner

*Primary Examiner*—Scott J. Sugarman
*Assistant Examiner*—Deborah Raizen
(74) *Attorney, Agent, or Firm*—Blakely, Sokoloff, Taylor & Zafman LLP

(57) ABSTRACT

In the beam path of an Optical Cross Connect between the front face of a fiber block and a moveable mirror array are placed a telecentric lens and multi-surface optical element. The lens is placed adjacent the front face with a front focal plane coinciding with the front face. The substantially parallel beam path axes between the front face and the telecentric lens are converted by the lens into dispersing directions towards the optical element. Discrete optical surfaces of the optical element redirect the dispersing beam paths in a fashion such that the beam paths coincide in the following with corresponding moveable mirrors of a mirror array. Pitches of arrayed fiber ends and of the optical surfaces as well as the moveable mirrors are independently selectable. The telecentric lens simultaneously focuses the signal beams with improved beam separation and reduced signal loss.

12 Claims, 7 Drawing Sheets

OPTICAL CROSS-CONNECT SWITCH WITH TELECENTRIC LENS AND MULTI-SURFACE OPTICAL ELEMENT

CROSS REFERENCE

The present application cross-references the U.S. patent application titled "Assembled Multi-surface Optical Component and Method for Fabricating" filed by inventor Alex Harwit on Jan. 29, 2003 with Ser. No. 10/354901, which is hereby incorporated by reference.

FIELD OF INVENTION

The present invention relates to Optical Cross-connect Switches (OXC). Particularly, the present invention relates to OXC with combined signal beam focusing.

In the field of optical telecommunication, Optical Cross-connect Switches (OXC) provide simultaneous switching of up to several thousands of signal beams. Generally, there is a continuing demand for OXC that can be more efficiently fabricated with ever increasing numbers of simultaneously switched signal beams.

For best understanding of the improvements provided by the present invention, a prior art OXC 100 may be initially described by referring to prior art FIG. 1. The prior art OXC 100 includes a bundle of incoming fibers 101 and outgoing fibers 112 that pass through a laser card 102 where a laser light is inserted and aligned with each beam path. Laser light is propagating in the same direction with the telecommunication signals along the input fibers 104. The laser light is propagating in the opposite direction with the telecommunication signals along the output fibers 111.

The fibers 104, 111 terminate with their fiber ends 208 (see FIG. 2) at the front face 113, 114 of the fiber blocks 105, 110, as is exemplarily depicted in FIG. 2. The signal beams emit/impinge at the front faces 113, 114 substantially collinear with the emitting laser beams. Each propagating signal beam is separately reflected together with its laser beam by a moveable mirror arrayed in the mirror arrays 106, 108. The movement of the moveable mirrors is coordinated such that a switching of the signal beams is accomplished by spatially reorienting the beam paths between the mirror arrays 106, 108.

The laser beams injected by the laser card are deflected by the moveable mirrors in the same fashion as the signal beam. A dichroic flat 109 placed in the beam paths between the mirror arrays 106, 108 is configured for filtering the laser light by reflecting only the signal beams. The laser light impinges a PDA detector 103 placed immediately behind the dichroic flat 109. The PDA detector 103 recognizes the impinging coordinates of the lasers, which is part of a feedback loop utilized by the processor 107 to monitor and control the moveable mirrors. Each telecommunication beam is reflected along its path between the fiber blocks 105, 110 at the mirror array 106, the dichroic flat 109 and the mirror array 108.

Light emits from the fiber ends 208 (see FIG. 2) with a certain dispersion angle making it necessary to focus the signal beams before directing it towards the mirror array 106. Also, the switched signal beams need to be focused and narrowed before impinging the fiber ends 208 at the fiber block 110. In the prior art OXC 100, this is accomplished by separately focusing each signal beam. As is illustrated in the prior art FIGS. 2, 3, a number of lenses 204 is arrayed and positioned in alignment with their corresponding fiber ends 208. The lenses 204 are fabricated with high precision into a lens plate 205 that is fixed with its frame 206 to the main housing 200 after a precision alignment procedure.

As can be seen in prior art FIG. 3 there are certain design limitations associated with the use of a lens plate 205. Signal beams emit/impinge the fiber ends 208 within the conical beam boundaries 301. To provide sufficient spacing for the alignment and positioning, the lens plate 205 needs to be spaced apart the end faces 113, 114. In order to capture the entire signal beam, each lens 204 has to have a diameter that at least equals the lateral extension of a conical boundary 301 where the signal beam impinges the lens 204. Also, due to precision limitations of the optical elements in the beam path, the signal beam may have a certain scattering angle with which it propagates towards the opposing fiber block 110. This may result in an extended width of it, which also needs to be captured by the lenses 204. Hence, the lenses 204 have to be substantially larger in diameter than the diameter of the fiber ends 208.

In addition to the required lens diameter, the lenses 204 need to be sufficiently spaced to each other for fabrication purposes. The design requirements for lens diameter and lens pitch mainly limit the minimal pitch 303, with which the fiber ends 208 are arrayed within the fiber blocks 105, 110. At the time this invention was made, an exemplary pitch 303 of a prior art OXC 100 is about 1 mm.

The monolithic fabrication of the small-scale lenses 204 is very cost intensive. Each lens 204 has to be fabricated with the same precision. Scaling of an OXC 100 for a larger number of simultaneously switched telecommunication signals is limited by the increasing costs associated with the fabrication of the lens plate 205.

Due to the small lens sizes, the achievable focusing precision is relatively low compared to larger size lenses. As a result, the optical path between the fiber blocks 105, 110 needs to be kept as short as possible, which in turn defines the required tilt range of each movable mirror. Unfortunately, the efficiency of the OXC 100 is significantly influenced by the precision and speed with which the two axes tilt movement of each moveable mirror is accomplished. For that purpose it is desirable to have the maximum required tilt range of the moveable mirrors at a minimum. At the time this invention was made, an exemplary tilt angle of a moveable mirror is about 8 degrees.

The fabrication of the small scale lenses 204 results also in limited surface quality of each lens 204, which in turn induces a certain loss of signal strength. At the time this invention was made, the loss of signal strength in an exemplary prior art OXC 100 is about 2 dB. It is desirable to reduce this loss.

The separate focusing of each signal beam with a monolithic lens array requires also substantially parallel beam propagation between the fiber blocks 105, 110 and their adjacent mirror arrays 106, 108. Thus, dimensional scaling of the mirror array is dependent on scaling of the fiber blocks pitch and lens array.

Finally, the use of a laser card 102 is a cost intensive device for injecting laser light into the signal beams. Optical elements have to be additionally provided for separately injecting the laser light into each signal line. It is desirable to have an OXC with a configuration in which laser light may be injected into the signal beams without need of a separate laser card.

The prior art OXC design of prior art FIGS. 1, 2, 3 has significant limitations summarized as follows:

1) the fabrication of the lens plate 205 is highly cost intensive since for each fiber end 208 a separate lens 204 needs to be provided;

2) as a consequence of using a lens array, the signal beams propagate substantially parallel between the fiber blocks 105, 110. This requires simultaneous scaling of fiber blocks 105, 110 and mirror arrays 106, 108;
3) miniaturization and scaling of the prior art OXC 100 is limited by the precision and cost with which the lens array 205 may be fabricated;
4) low focusing precision of the lens array 205 requires short beam paths between the fiber blocks 105, 110 and consequently increased tilt angles of the moveable mirrors;
5) reduced fabrication precision of the lens array results in loss of signal strength; and
6) cost intensive use of a laser card to inject laser light into the signal beams.

To overcome the limitations described above, an OXC design is needed in which:
1) focusing of the signal beams is accomplished in a simplified fashion and without use of a micro lens array to reduce fabrication cost, loss of signal strength;
2) scaling and miniaturization of fiber blocks, mirror arrays, dichroic flat and detector is highly independent of beam paths and individual elements' design constrains within the OXC; and
3) injecting laser into the signal beams without use of a separate laser card.

The OXC described in the following addresses this needs.

SUMMARY

The OXC of the present invention utilizes telecentric lenses in combination with multi-surface optical elements for a simultaneous focusing and directing of the signal beams between the fiber blocks and the moveable mirrors. A telecentric lens is placed adjacent to each of the two fiber blocks' front faces such that a front focal plane of the telecentric lens coincides with the respective fiber block's front face. The telecentric lenses accomplish two tasks simultaneously. Firstly, each signal beam is converted from a dispersing condition towards the telecentric lenses into a converging condition away from the telecentric lenses. The beams propagate towards the mirror array with converging beam widths, which results in improved beam separation and minimal loss of signal strength.

Secondly, each telecentric lens redirects the signal beams' axes from a substantially parallel direction at the front faces to dispersing directions such that the distance between adjacent beam path axes increases with the distance away from the telecentric lenses. The signal paths coincide centrally with optical surfaces of a multi-surface optical element placed at a certain distance away from the telecentric lens. The pitch of the beam axes at the multi-surface element is a multiple of the pitch with which the signal beams emit/impinge the fiber block providing for a larger scale fabrication of the optical surfaces. The multi-surface element redirects each beam path separately and in a fashion such that each beam path coincides with a single moveable mirror of a mirror array placed adjacent the optical element. The optical surfaces are positioned and oriented in a fashion that corresponds on one hand to the direction of the dispersing path axes and on the other hand to the mirror arrays' pitch and distance to the optical element. Thus, by introducing a telecentric lens, the pitches of the fiber ends, the optical surfaces and the arrayed moveable mirrors may be separately selected.

In the preferred embodiment, the optical surfaces are planar mirrors that are easily fabricated. In that context it is referred to the cross-referenced application. Also, the use of a telecentric lens instead of arrayed micro lenses greatly reduces signal losses and provides for more flexibility in the configuration of the beam paths between the mirror arrays. As a consequence, the mirror arrays may be placed in a greater distance to each other, which in turn reduces the maximal required tilt angle of the moveable mirrors. The telecentric lens may be in a commercially available configuration.

The telecentric lens may be configured with a front focal length sufficiently long such that a beam splitter may be placed between the fiber blocks and the telecentric lenses. Through the beam splitter, the signal beams are accessed for laser injection and other monitor functions eliminating the need for the laser card.

DETAILED DESCRIPTION

Figure 1:
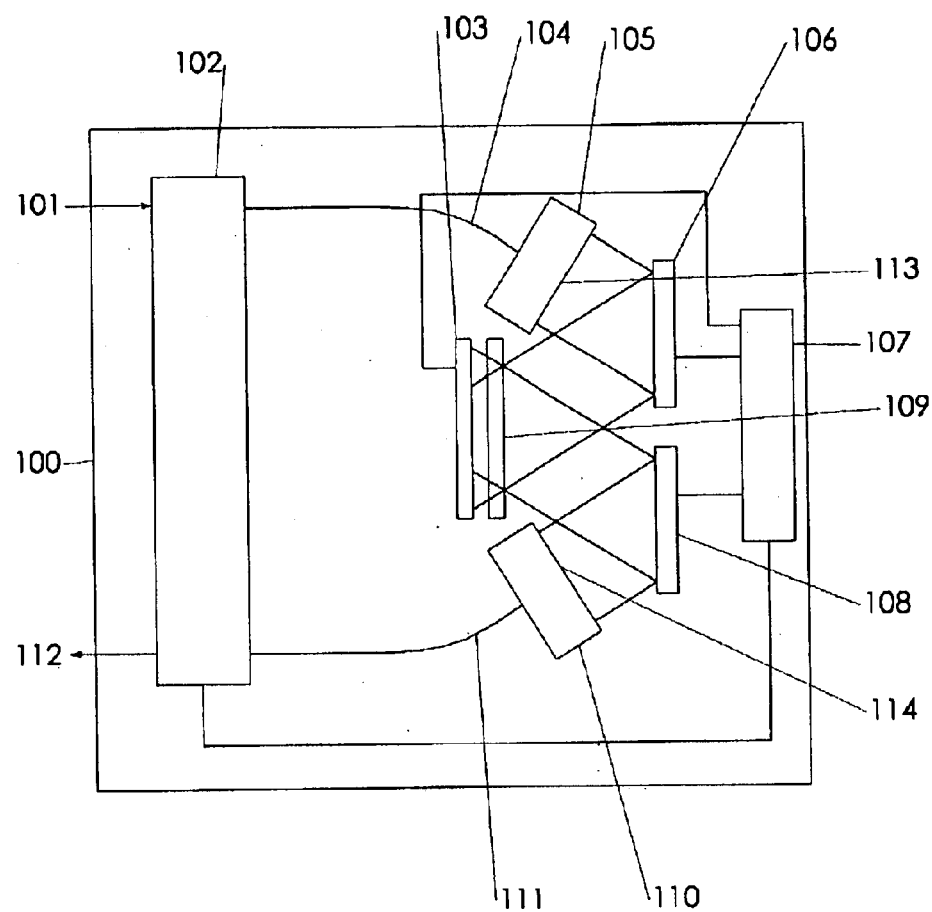
FIG. 1 shows a schematic view of a prior art Optical Cross Connect [OXC].
Figure 2:
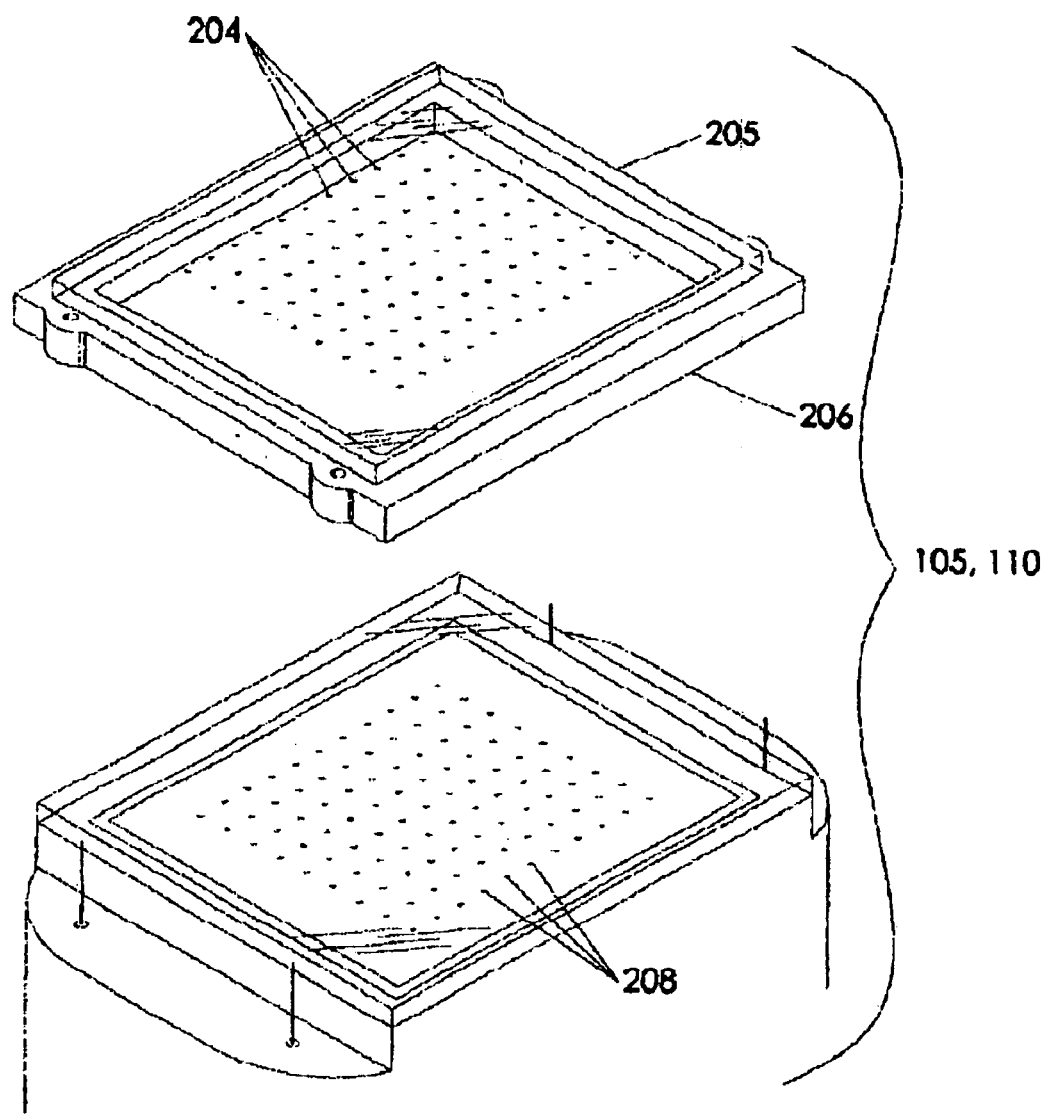
FIG. 2 shows a perspective exploded view of a prior art fiber block with a lens plate.
Figure 3:
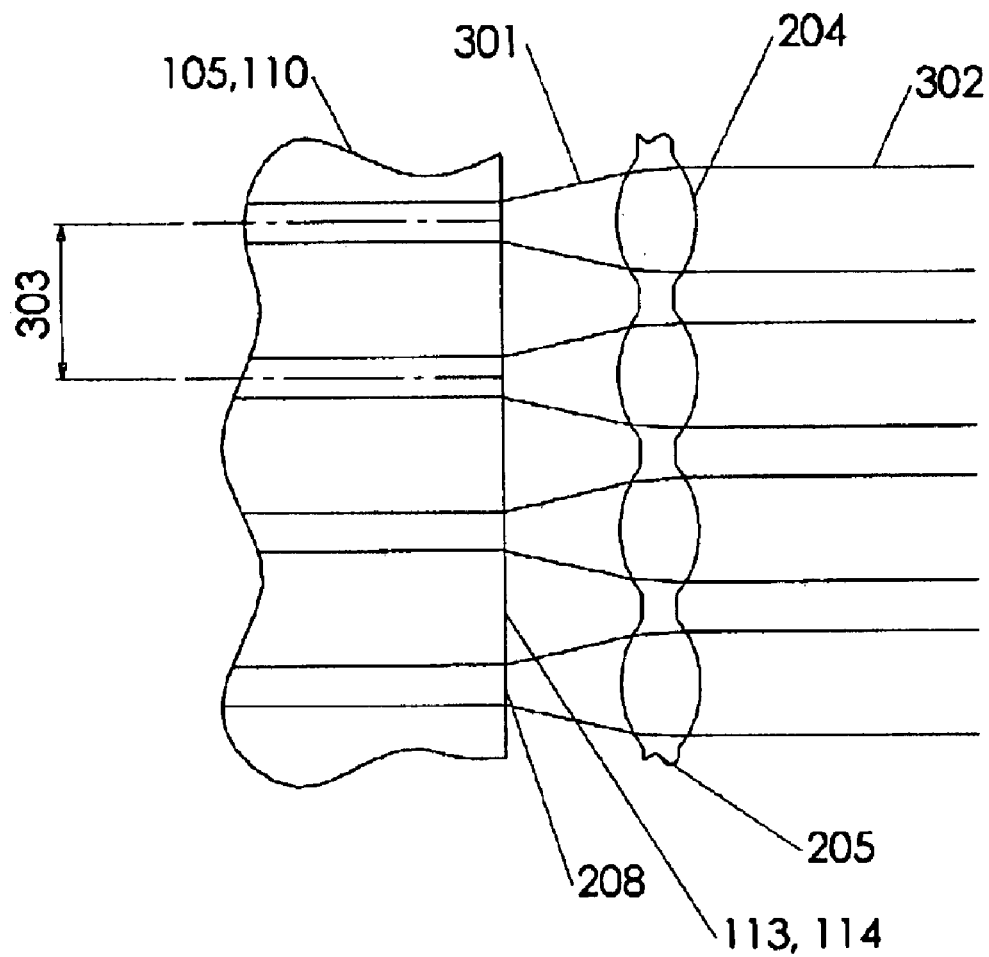
FIG. 3 shows a section view of a prior art fiber block and a lens plate.
Figure 4:
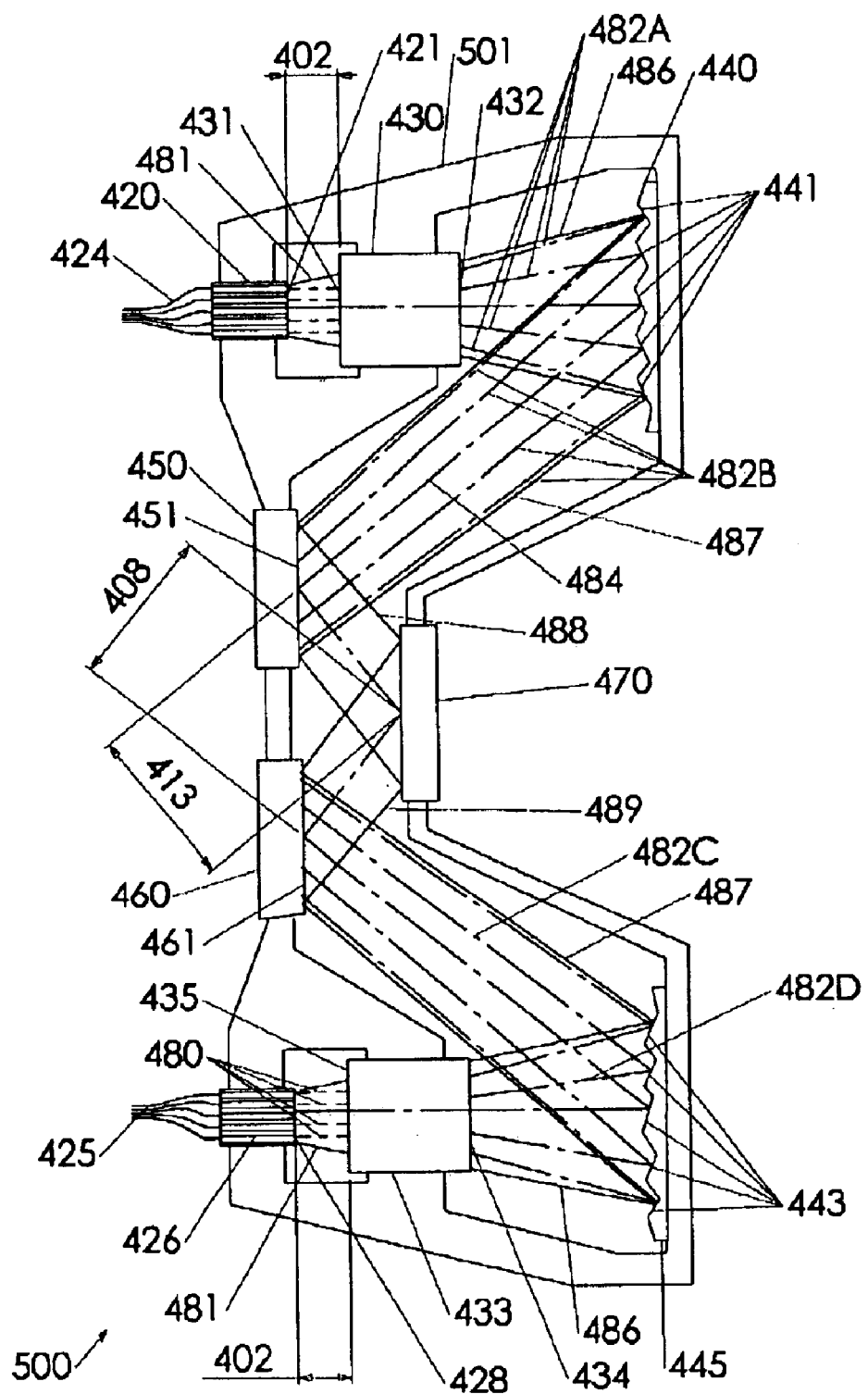
FIG. 4 depicts a simplified OXC of the present invention.

Referring to FIG. 4, an Optical Cross Connect [OXC] 500 of the present invention includes a housing 501 is connected to an incoming fiber string 424 and an outgoing fiber string 425. The optical fibers of the incoming string 424 are inserted in fiber block 420 and terminate at the fiber block's 420 front face 421. The optical fibers of the outgoing string 425 are inserted in the fiber block 426 and terminate at the fiber block's 426 front face 428. Signal beams emit at the first front face 421, propagate along the main path 484 through the OXC 500 and impinge the second front face 428.

The emitting signal beams impinge a first front side 431 of a first telecentric lens 430. The telecentric lens 430 is configured in a well known fashion to simultaneously transform the distinct signal beams' propagation characteristic such that the signal beams emit from telecentric lens' 430 first back side 432 with dispersing beam axes 482A and converging beam widths 486 (see FIG. 5).

Along the main path 484 and following the telecentric lens 430 in direction of signal beam propagation is placed a first multi-surface optical element 440 that has a number of discrete optical surfaces 441. In the preferred embodiment, the discrete optical surfaces 441 are planar mirrors. Each of the surfaces 441 has a unique position and orientation with respect to preferably one impinging signal beam such that all signal beams are independently redirected towards a number of moveable mirrors arrayed at the front 451 of a first mirror array 450. Hence, after impinging the surfaces 441, the signal beams propagate away from the first optical element 440 and towards the first mirror array 450 along beam axes 482B.

The first optical element 440 provides for an individual redirecting of each signal beam. In the preferred embodiment, the beam axes 482A are converted from a dispersing condition into a converging condition of the beam axes 482B.

Between first mirror array 450 and second mirror array 460, the switching of the signal beams takes place by correspondingly actuating the mirrors of both mirror arrays 450, 460. The switching of signal beams takes place by spatially redirecting them while they are propagating from mirror array 450 to mirror array 460. The spatial redirected beams remain within the boundaries 488 and 489. The signal beams propagating between mirror array 450 and 460 impinge and are reflected by a dichroic flat 470, which filters control laser beams from the signal beams.

The signal beams impinge the moveable mirrors of the mirror array 461 and are redirected again towards a second optical element 445 having discrete optical surfaces 443. Between first and second mirror array 450, 460, the signal beams propagate within the boundaries 488 along beam axes that change as a result of the induced switching operation(s) performed by moveable mirrors. At the second mirror array 460 the signal beams' axes are again brought into a stable condition with their beam axes dispersing in constant directions 482C away from the mirror array 460. The beam axes 482C are spatially oriented in correspondence to the position of the second optical surfaces 443 where they are redirected towards a second telecentric lens 433. The signal beams propagate from the second multi-surface optical element 445 again with converging beam axes 482D towards the second back side 434 of the second lens 433.

The second telecentric lens 433 induces a simultaneous transformation to the signal beams in a fashion such that the signal beams emitting on the second front side 435 impinge at predetermined locations on the second front face 428. The predetermined locations are within the boundaries of the fiber ends of the second fiber string 425 and the signal beams are injected again into the optical fibers of the second fiber string 425.

The upper portion of the OXC 500 including the first fiber block 420, the first telecentric lens 430, the first optical element 440 and the first mirror array 450 is preferably symmetrical to the lower portion of the OXC 500 including the second fiber block 426, the second telecentric lens 433, the second optical element 445 and the second mirror array 460. All signal beams propagate within the OXC 500 within the boundaries 481, 486, 487, 488 and 489. The terms upper portion and lower portion pertain to the FIG. 4 and are introduced solely for the purpose of ease of understanding. The telecentric lenses 430, 433 have symmetry axes that preferably coincide with main path 484.

Figure 5:
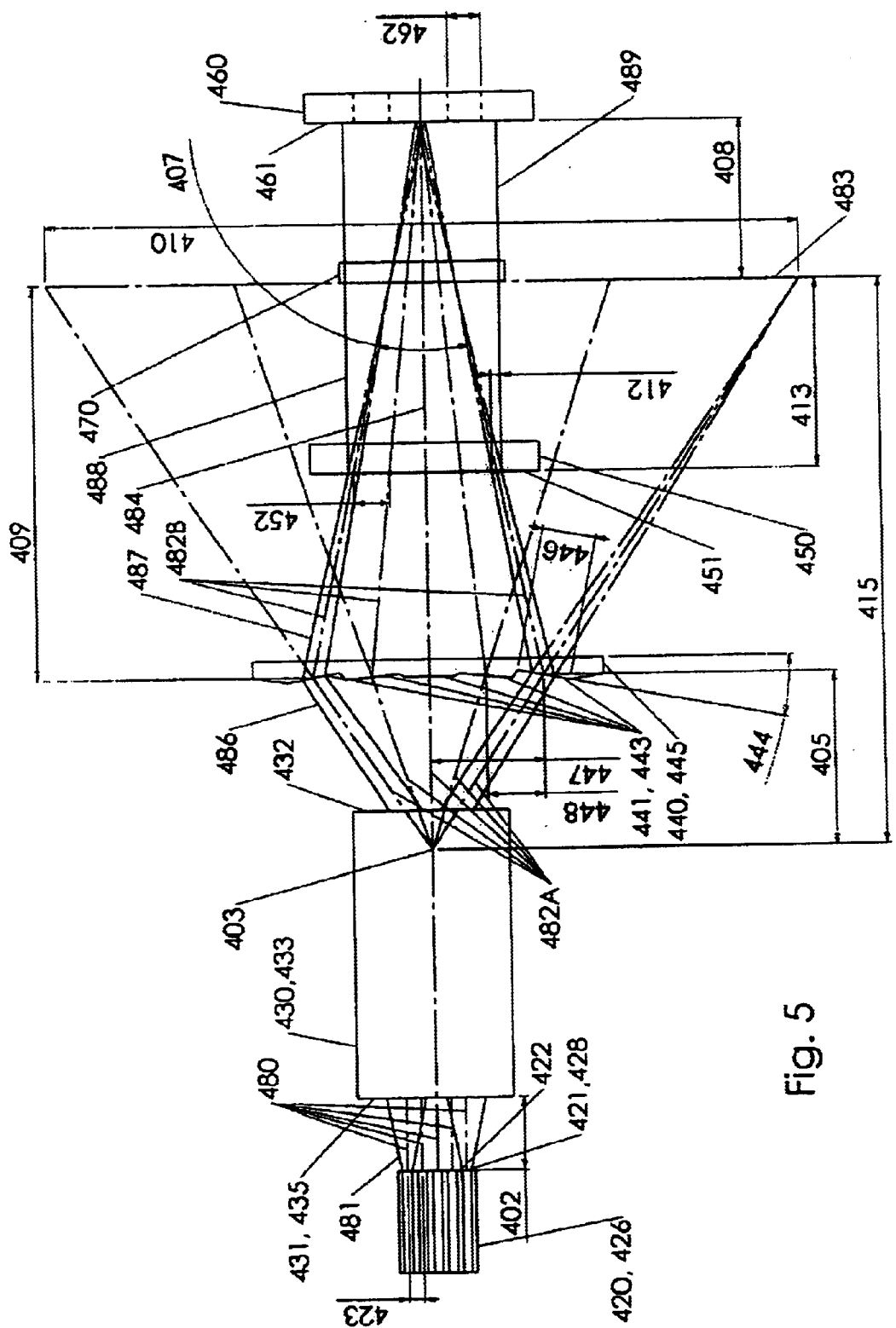
FIG. 5 schematically illustrates a portion of the beam paths of an OXC in accordance with the present invention.

Now turning to FIG. 5, the geometrical configuration of the upper portion of the OXC 500 is described in detail. Due to the preferably symmetrical configuration of upper and lower portion, the teachings presented in the following for the upper portion may be applied to the lower portion with inverted propagation directions of the signal beams as can be well appreciated by anyone skilled in the art. The fiber ends are parallel arrayed in the fiber block 420 with a first pitch 423. Consequently, the signal beams emit with substantially parallel first beam axes 480 and a certain, well-known scattering angle that results in conical beam boundaries 481. Since the telecentric lenses 430, 433 provide a simultaneous beam transformation, the signal beams may overlap when they impinge/emit the front faces 431, 435. This is particularly advantageous because the minimization of the first pitch 423 is no longer influenced by dimensional limitations of the involved optical components.

In the present invention the first pitch 423 may be provided with 0.22 mm compared to about 1 mm in the prior art. This example demonstrates the dramatic increase of signal beam density achieved by utilizing telecentric lenses 430, 433. Reducing the pitch from 1 mm to 0.22 mm increases the signal beam density more than twenty fold.

Since in the present invention the signal beams may overlap between the fiber block fronts 421, 428 and the lens fronts 431, 435, the distance between then may be freely selected. The lenses 433, 430 are accordingly configured such that a front focus of the lenses 433, 430 coincides with the fiber block fronts 421, 428. The distance 402 may be defined sufficiently large for additional optical component(s) to be placed between the fiber block fronts 421, 428 and lens fronts 431, 435. Such additional optical component(s) may provide an interaction with the signal beams similar to that of a well-known laser card and will be described further below together with FIG. 6.

For the purpose of ease of understanding, the main path 484 is shown in FIG. 5 as a straight line with the optical elements 440, 445, the mirror arrays 450, 460 and the dichroic flat 470 considered as being translucent. Also, the orientation of the optical surfaces 441, 443 is shown in FIG. 5 without regards to their function and solely for ease of understanding of some general dimensional relations of the OXC 500.

The beam transformation performed by the lens 430 includes a transformation from substantial parallel beam axes 480 towards the front side 431 into dispersing beam axes 482A away from the back side 432. The beam transformation performed by the lens 430 also includes a transformation from dispersing beam widths 481 towards the lens front 431 into converging beam widths 486 away from the lens back 432.

The beam transformation performed by the lens 433 includes a transformation from dispersing beam axes 482 towards the back side 434 into substantial parallel beam axes 480 away from the front side 435. The beam transformation performed by the lens 433 also includes a transformation from converging beam widths 486 towards the lens back 434 into dispersing beam widths 481 away from the lens front 435.

The beam widths 486 approach zero towards a reference plane 483, which is preferably perpendicular to the lenses' 430, 433 symmetry axes. It is desirable to have each beam's widths 486 equal at the moveable mirror arrays 450, 460. Hence, the distances 413, 408 between the mirror arrays 450, 460 and the dichroic flat 470 are preferably substantially equal. For equal beam widths 486 at the moveable mirrors 450, 460 the reference place 483 ideally coincides with the dichroic flat 470.

The most peripheral beam axes 482 are at a certain distance 410 at the reference plane 483. A first scaling rate of the beam axes 481 is defined as the proportion between the distance 410 and a distance 415 between the reference plane 483 and a common point 403 where the beam axes 482 intersect. The common point 403 is a theoretical point inside the telecentric lenses 430, 433 and is defined by a well known combination of individual lenses lined up inside the telecentric lenses 430, 433. The scale of the optical elements 440, 445 is defined in correspondence to the first scaling rate and a distance 405 of the optical elements 440, 445 to the common point 403. In the preferred embodiment, the telecentric lenses 430, 433 are preferably substantially equal with equally positioned common point 403. As may be well appreciated by anyone skilled in the art, the widths 446 and second pitch 448 of the optical surfaces 443 are a function of the first scaling rate, the distance 405 and the number of signal beams along second pitch direction.

Each optical surface 441, 443 has a distinct angular orientation 444, which is defined for its position relative to the main path 484 in accordance with well-known optical principles for redirecting optical beams and in conjunction with optical properties of the optical surface.

A second scaling rate is defined as the proportion between the distance of the most peripheral impinging locations on the optical elements 440, 445 and the distance 409 plus distance 408. A third pitch 452, 463 with which the moveable mirrors is arrayed on the mirror arrays 450, 460 is a function of the second scaling rate, the distances 413, 408 and the number of signal beams along third pitch direction.

As illustrated in FIG. 5, the optical surfaces 441 are orientated such that the beam axes 482B preferably coincide at the mirror array 460. This condition may be applied for the lower portion in the way that the beam axes 482C preferably coincide at the mirror array 450. Consequently, a maximum tilt angle 407 of the moveable mirrors may be a trigonometric function of the second scaling rate. The maximum tilt angle 407 is thus reduced by reducing the second scaling rate.

Figure 6:
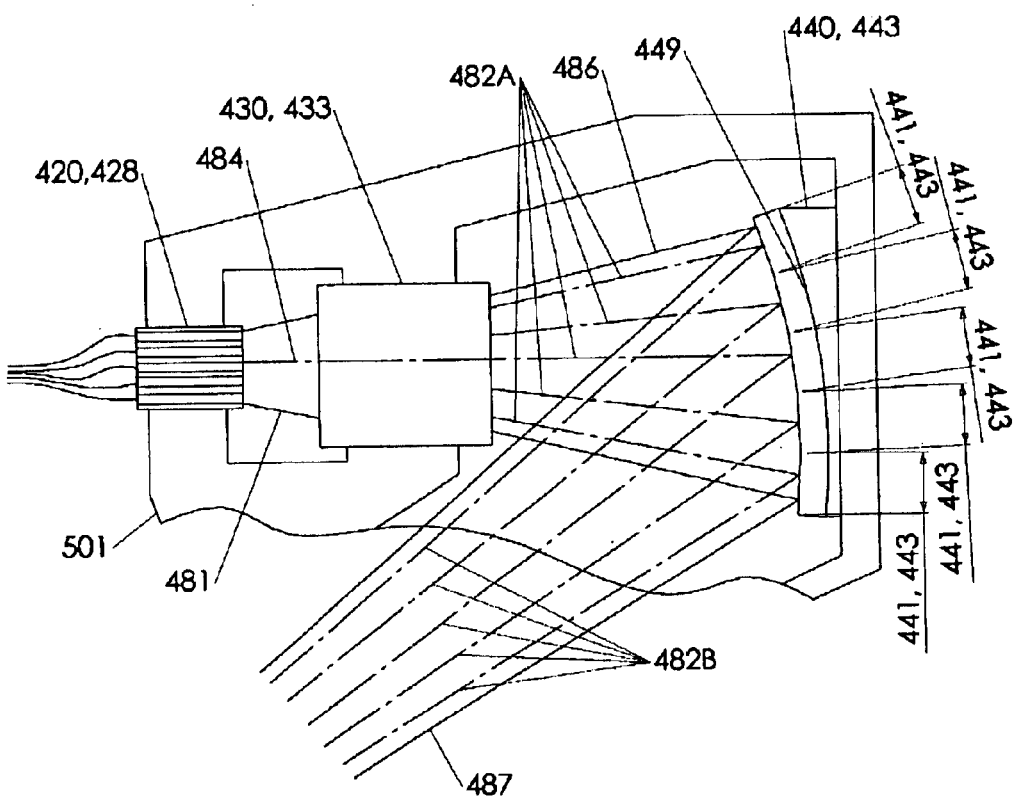
FIG. 6 shows a portion of an OXC with a multi-surface optical element in alternate configuration.

Turning now to FIG. 6, an alternate embodiment of the OXC 500 is described. There, the multi-surface optical elements 440, 443 feature a reference surface 449 along which the optical surfaces 441, 443 are aligned. The reference surface 449 may have a continuous geometric configuration that corresponds to the directional change between beam axes 482A and beam axes 482B in accordance with the physical laws of optical reflection. For more details refer to the cross-referenced application.

Figure 7:
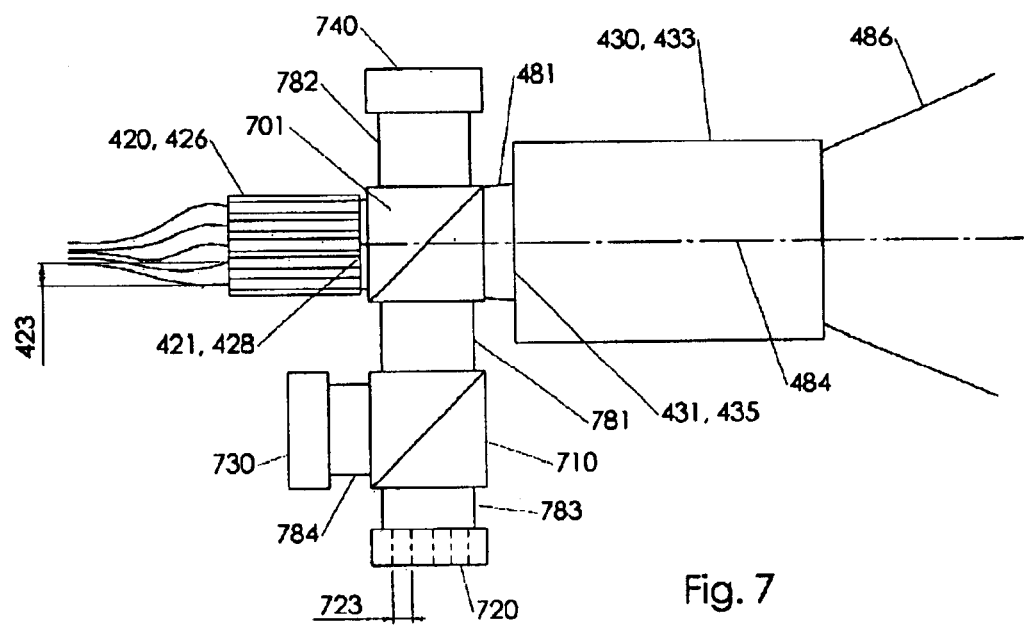
FIG. 7 shows a fiber block and a telecentric lens with a beam splitter assembly placed between them.

Finally FIG. 7 may be described in more detail. There an embodiment of the OXC 500 is depicted in which a beam splitter 701 is placed between the fiber blocks 420, 428 and the lenses 430, 433. The beam splitter 701 splits signal beam portions 782 off the signal beams and directs them towards monitoring device 740, which may be a well-known InGaAs camera for monitoring signal strength. At the same time, the beam splitter 701 injects laser beams 781 coming from a secondary beam splitter 710. The secondary beam splitter 710 receives laser pulses 783 from a lasing device 720, which may be for example a vertical cavity surface emitting laser array. Such VCSEL are commercially available with standardized pitch 723. Making the first pitch 423 equal to the standardized pitch 723 is a significant factor for directly inserting the laser into the signal beams. The amount of additional optical components may be kept to a minimum.

The secondary beam splitter 710 directs a laser light portion 784 towards a laser monitoring device such as a well-known PSD3.

An exemplary OXC 500 in accordance with a preferred embodiment of the present invention may have the following characteristics:

| | |
|---|---|
| path length 484: | 1100 mm; |
| throughput loss: | 1 db; |
| maximum tilt angle 407: | 3.5 degrees; |
| first pitch 423: | 0.22 mm; |
| number of mirrors/pitch 452 of mirror arrays 450, 460: | 30 × 40/1 mm; |
| mirror tilt accuracy: | 0.0015 degrees; |
| required angular accuracy of optical surfaces 440, 445: | 0.01 degrees; |
| mainframe size of housing 501: | 10.5 × 6.1 × 3.5 inches. |

Accordingly, the scope of the invention described in the specification above is set forth by the following claims and their legal equivalent.

Accordingly, the scope of the invention described in the specification above is set forth by the following claims and their legal equivalent.

What is claimed is:

1. An optical cross connect comprising:
   a. a main path along which signal beams propagate between first fiber ends arrayed in a first fiber block and second fiber ends arrayed in a second fiber block;
   b. a telecentric lens having a symmetry axis coinciding with said main path and a configuration for inducing a simultaneous transformation to a number of distinctly propagating signal beams from a first beam propagating condition into a second propagating condition and vice versa, said first propagating condition including first beam axes of said signal beams substantially parallel to said main path between one of said fiber blocks and a front side of said lens and including beam widths increasing towards said front side, said second propagating condition including second beam axes dispersing in direction away from a back side of said lens and including second beam widths decreasing away from said back side and zeroing at a reference plane; and
   c. an optical element having a number of distinct optical surfaces and being configured and positioned with respect to said lens such that at least one of said second beam axes coincides with at least one of said optical surfaces, and wherein at least one of said optical surfaces is oriented such that at least one of said second beam axes is redirected into third beam axes towards one of a number of moveable mirrors arrayed on a mirror array of said optical cross connect.

2. The optical cross connect of claim 1, wherein said reference plane coincides with a dichroic flat of said optical cross connect.

3. The optical cross connect of claim 1, wherein said lens configuration is adjusted to:
   a. a first pitch of said first and/or said second fiber ends are arrayed with a first pitch on said fiber blocks;
   b. a second pitch of said optical surfaces on said optical element;
   c. a distance of said optical element to said lens along said main path.

4. The optical cross connect of claim 3, wherein said first pitch is selected in combination with a standardized pitch of a vertical cavity surface emitting laser.

5. The optical cross connect of claim 4, wherein a second pitch of said optical surfaces arrayed on said optical element is adjusted to:
   a. said dispersing direction of said second beam axes; and
   b. a distance of said optical element relative to said lens.

6. The optical cross connect of claim 4 wherein a third pitch of said moveable mirrors on said mirror array is adjusted to:
   a. second pitch of said optical surfaces arrayed on said optical element;
   b. said third beam axes; and c. a distance of said mirror array relative to said optical element.

7. A telecentric lens comprising a configuration for inducing a simultaneous transformation to a number of distinctly propagating signal beaks from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side and zeroing at a reference place, wherein said lens has an assembly position in an optical cross connect and said simultaneous transformation is selected such that at least one of said first beam axes coincides with a fiber end of said optical cross connect.

8. A telecentric lens comprising a configuration for inducing a simultaneous transformation to a number of distinctly propagating signal beams from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side and zeroing at a reference place, wherein said lens has an assembly position in an optical cross connect and said simultaneous transformation is selected such that at least one of said second beam axes coincides with an optical fiber surface of an optical cross connect.

9. A telecentric lens comprising a configuration for inducing a simultaneous transformation to a number of distinctly propagating signal beams from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side and zeroing at a reference place, wherein said lens has an assembly position in an optical cross connect such that said reference plane coincides with a dichroic flat of an optical cross connect.

10. An optical system comprising:
a. a telecentric lens having a configuration for inducing a simultaneous transformation to a number of distinctly propagating signal beams from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side; and
b. an optical element having a number of distinct optical surfaces and being configured and positioned with respect to said lens such that at least one of said second beam axes coincides with at least one of said optical surfaces, wherein at least one of said optical surfaces is oriented such that at least one of said second beam axes is redirected from a dispersing direction into a converging direction, and wherein said optical surfaces are positioned and oriented such that said second beam axes are redirected to coincide with moveable mirrors of an optical cross connect.

11. An optical system comprising:
a. a telecentric lens having a configuration for inducing a simultaneous transformation to a number of distinctly propagating signal beams from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side; and
b. an optical element having a number of distinct optical surfaces and being configured and positioned with respect to said lens such that at least one of said second beam axes coincides with at least one of said optical surfaces, wherein at least one of said optical surfaces is oriented such that at least one of said second beam axes is redirected from a dispersing direction into a converging direction;
wherein said system has an assembly position in an optical cross connect and said simultaneous transformation is selected such that at least one of said first beam axes coincides with a fiber end of said optical cross connect.

12. An optical system comprising:
a. a telecentric lens having a configuration for inducing a simultaneous transformation to a number of distinctly propagating signal beams from a first beam propagating condition into a second propagating condition and vice versa, said first propagating condition including substantially parallel first beam axes of said signal beams at a front side of said lens and including beam widths increasing towards said front side, said second propagating condition including second beam axes dispersing in direction away from a back side of said lens and including second beam widths decreasing away from said back side; and
b. an optical element having a number of distinct optical surfaces and being configured and positioned with respect to said lens such that at least one of said second beam axes coincides with at least one of said optical surfaces, wherein at least one of said optical surfaces is oriented such that at least one of said second beam axes is redirected from a dispersing direction into a converging direction;
wherein said system has an assembly position in an optical cross connect such that a reference plane of said lens coincides with a dichroic flat of an optical cross connect, wherein said second beam widths reach zero at said reference plane.

* * * * *